(12) United States Patent
Jenkins et al.

(10) Patent No.: US 6,540,188 B2
(45) Date of Patent: Apr. 1, 2003

(54) MOUNTING ARRANGEMENT FOR MULTI-FUNCTIONAL ARM

(75) Inventors: Anthony Jenkins, Clawson, MI (US); Michael Filipiak, Ann Arbor, MI (US); Bradly Truhn, Ypsilanti, MI (US); Mansoor Eslami, Ann Arbor, MI (US)

(73) Assignee: Syron Engineering & Manufacturing, L.L.C., Saline, MI (US)

( * ) Notice: Subject to any disclaimer, the term of this patent is extended or adjusted under 35 U.S.C. 154(b) by 0 days.

(21) Appl. No.: 09/808,434

(22) Filed: Mar. 14, 2001

(65) Prior Publication Data

US 2002/0130234 A1 Sep. 19, 2002

(51) Int. Cl.[7] .............................. E04G 3/00; B66C 23/00
(52) U.S. Cl. ................... 248/276.1; 248/282.1; 403/56; 414/680
(58) Field of Search .............................. 248/276.1, 681, 248/220.22, 221.11, 222.12, 222.13, 222.14, 288.31, 282.1; 403/316, 353, 56; 901/128; 414/680

(56) References Cited

U.S. PATENT DOCUMENTS

| | | | | |
|---|---|---|---|---|
| 1,382,783 A | * | 6/1921 | Howard | 248/276.1 |
| 4,370,091 A | * | 1/1983 | Gagliardi | 414/735 |
| 4,402,481 A | * | 9/1983 | Sasaki | 248/282.1 |
| 4,898,490 A | * | 2/1990 | Herbermann et al. | 403/56 |
| 5,071,309 A | * | 12/1991 | Herbermann | 414/680 |
| 5,284,366 A | * | 2/1994 | Herbermann et al. | 285/26 |
| 5,746,567 A | * | 5/1998 | Herbermann et al. | 414/749.6 |
| 5,921,694 A | * | 7/1999 | Herbermann | 403/56 |

* cited by examiner

Primary Examiner—Anita King
(74) Attorney, Agent, or Firm—Carlson, Gaskey & Olds

(57) ABSTRACT

A mounting arrangement includes a multi-functional arm mounted in a mounting receiver. The arm includes a forward enlarged section, an intermediate recessed section, and a rearward enlarged section. The mounting receiver includes a forward mounting portion, an intermediate open portion, and a rearward mounting portion. The arm is mounted by aligning the intermediate recessed section of the arm over a top opening in the forward mounting portion, lowering the arm and sliding it rearwardly. A pair of pins on the arm engage a pair of aligned apertures on the front surface of the forward mounting portion to minimize looseness between the arm and the mounting receiver. A latch mechanism engages the arm to secure the arm in the mounting receiver and provides a visual indication that the arm is properly engaged. When the latch mechanism is pivoted by an operator inwardly, the latch mechanism disengages the arm, allowing removal of the arm from the mounting receiver. A rotatable handle is utilized to engage the arm and further acts to reduce looseness.

21 Claims, 7 Drawing Sheets

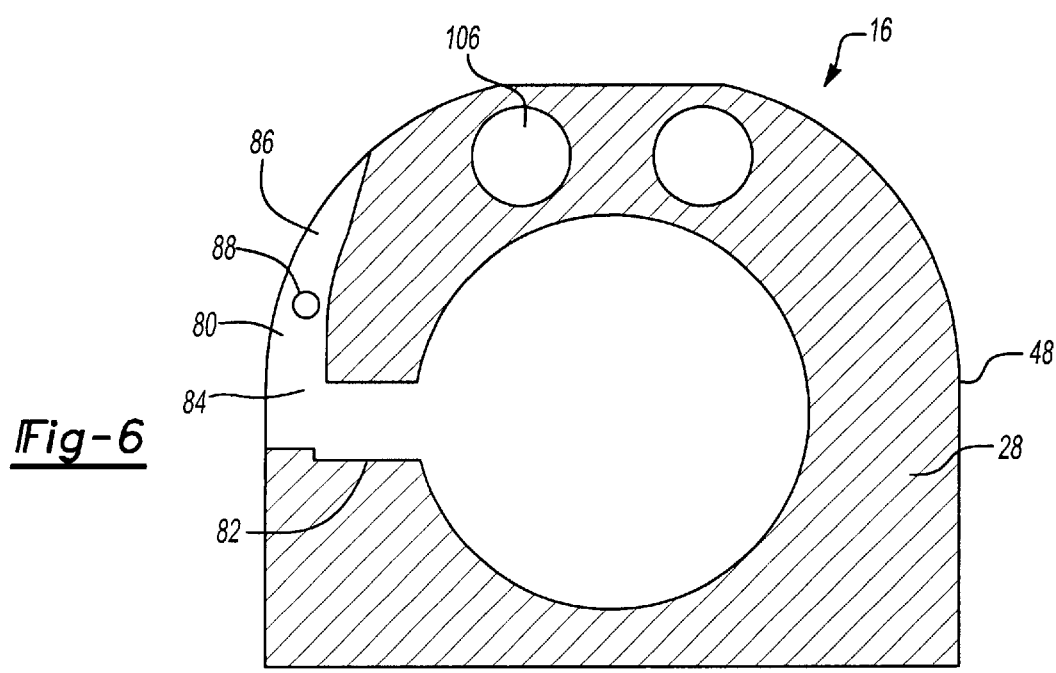
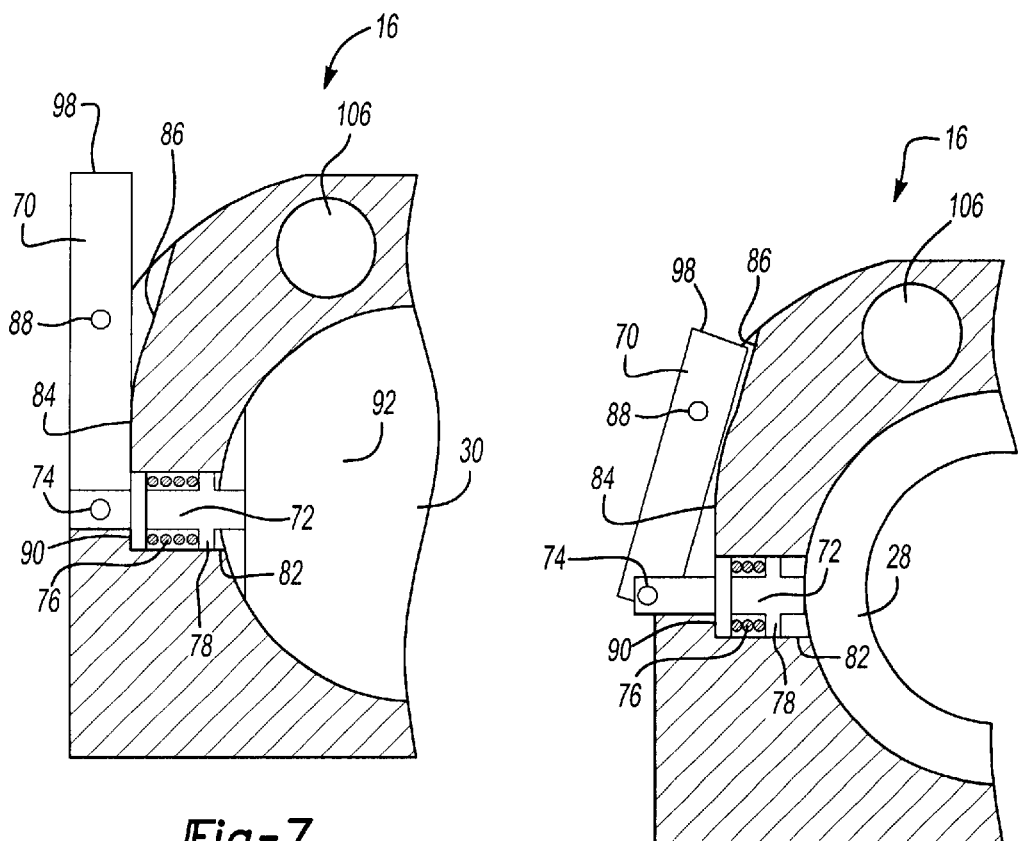

MOUNTING ARRANGEMENT FOR MULTI-FUNCTIONAL ARM

BACKGROUND OF THE INVENTION

The present invention relates generally to a mounting arrangement for a multi-functional arm.

Quick connect mounting arrangements are utilized to quickly attach an arm to a mounting receiver without completely disassembling the mounting arrangement. One problem with a quick connect mounting arrangement is that a relatively large amount of clearance distance forward of the mounting receiver is needed as the arm is slid into the mounting receiver. Additionally, the arm must be supported over a sufficient axial distance so the mounting receiver can absorb any stresses or forces on the arm.

Prior quick connect mounting arrangements have included a "dog-bone" styled arm including forward and rearward enlarged sections and an intermediate recessed section, and a mounting receiver including forward and rearward mounting sections and an intermediate open section.

The prior art designs have included a spring biased latch mechanism which engages and secures the arm in the mounting arrangement. When the arm is to be removed from the mounting arrangement, the latch mechanism is disengaged from the arm, allowing removal of the arm. The prior art arm has included a flat surface which aligns with a guide portion to insure proper alignment and orientation of the arm in the mounting receiver. A manually turned handle is also commonly employed. As the handle is rotated, a threaded portion engages the arm, minimizing the looseness of the arm in the mounting receiver.

One drawback to prior art quick connect mounting arrangements is that an operator may forget to utilize the handle. If this occurs, the arm may become loose in the mounting receiver during operation. The prior art mounting arrangements have not employed any features which minimize looseness between the arm and the mounting arrangement.

Hence, there is a need in the art for an improved mounting arrangement for a multi-functional arm.

SUMMARY OF THE INVENTION

The present invention relates generally to a mounting arrangement for a multi-functional arm.

A mounting arrangement includes a multi-functional arm mounted in a mounting receiver. The arm includes a forward enlarged section, an intermediate recessed section, and a rearward enlarged section. The mounting receiver includes a forward mounting portion, an intermediate open portion, and a rearward mounting portion. The forward mounting portion include a pair of opposed flanges which define a top opening. The arm is mounted by aligning the intermediate recessed section of the arm over the top opening of the forward mounting portion of the mounting receiver. The arm is then lowered into the mounting receiver and slid rearwardly. While the present invention is preferably utilized in this type of receiver, it also has benefits in other receiver structures.

A collar on the arm includes a pair of pins which engage a pair of aligned apertures on the front surface of the forward mounting portion when the arm is mounted. The engagement of the pins in the apertures locate and orient the arm in the mounting receiver, minimizing looseness between the arm and the mounting receiver.

When the arm is received in the mounting receiver, a second latch member of a latch mechanism is spring biased to engage the intermediate recessed section of the arm, preventing removal of the arm. When the arm is to be removed, a first latch member pivotally attached to the second latch member is pressed inwardly. The second latch member disengages contact with the arm, allowing the arm to be removed from the mounting receiver. Additionally, the first latch member gives a visual indication when the arm is properly received in the mounting receiver.

Additionally, a handle can be utilized to secure the arm to the mounting portion and reduce looseness. After the arm is inserted and the second latch member indicates proper insertion, the handle is rotated to engage the arm.

Accordingly, the present invention provides a mounting arrangement for a multi-functional arm.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 6 illustrates a cross sectional view taken along line 6—6 of FIG. 4 of the latch mechanism;

FIG. 7 illustrates the latch member in the locked position;

FIG. 8 illustrates the latch member in the open position;

DETAILED DESCRIPTION OF THE PREFERRED EMBODIMENT

Figure 1:
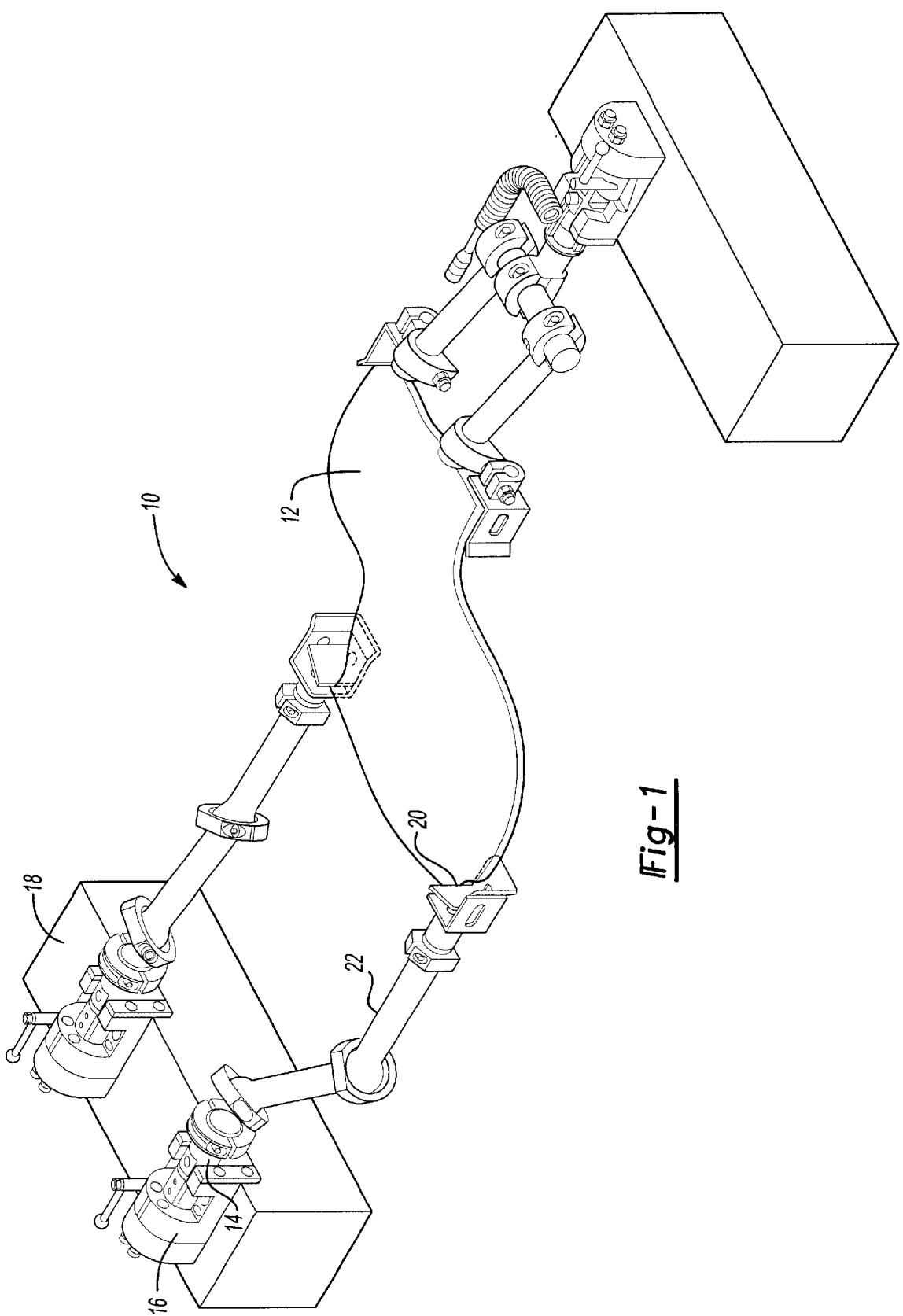
FIG. 1 illustrates a perspective view of a rail receiver assembly.

FIG. 1 illustrates a rail receiver assembly 10 utilized to grip and move an object 12. A multi-functional arm 14 is received in a mounting receiver 16 attached to a rail 18. Although only one mounting receiver 16 attached to the rail 18 is illustrated, it is to be understood that any number of mounting receivers 16 can be employed. A series of ball jointed links 22 attached to the arm 14 are attached to a gripper 20 which grips an object 12.

Figure 2:
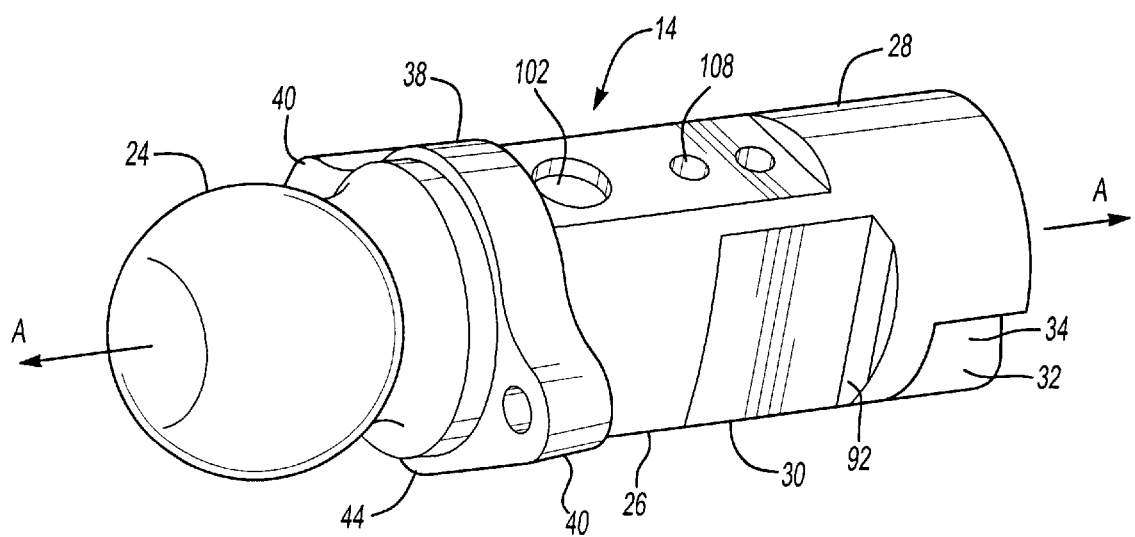
FIG. 2 illustrates a perspective view of the arm of the rail receiver assembly.

The substantially hollow arm 14 illustrated in FIG. 2 includes a ball joint 24 connected to the series of ball jointed links 22. Although a ball joint 24 is described, it is to be understood that alternative methods of attachment are possible. In one alternative method of attachment, branch clamps are utilized. The arm 14 further includes a forward enlarged section 26 having a forward outer dimension, a rearward enlarged section 28 having a rearward outer dimension, and an intermediate recessed section 30 having a recessed dimension and including an axis A.

Figure 3:
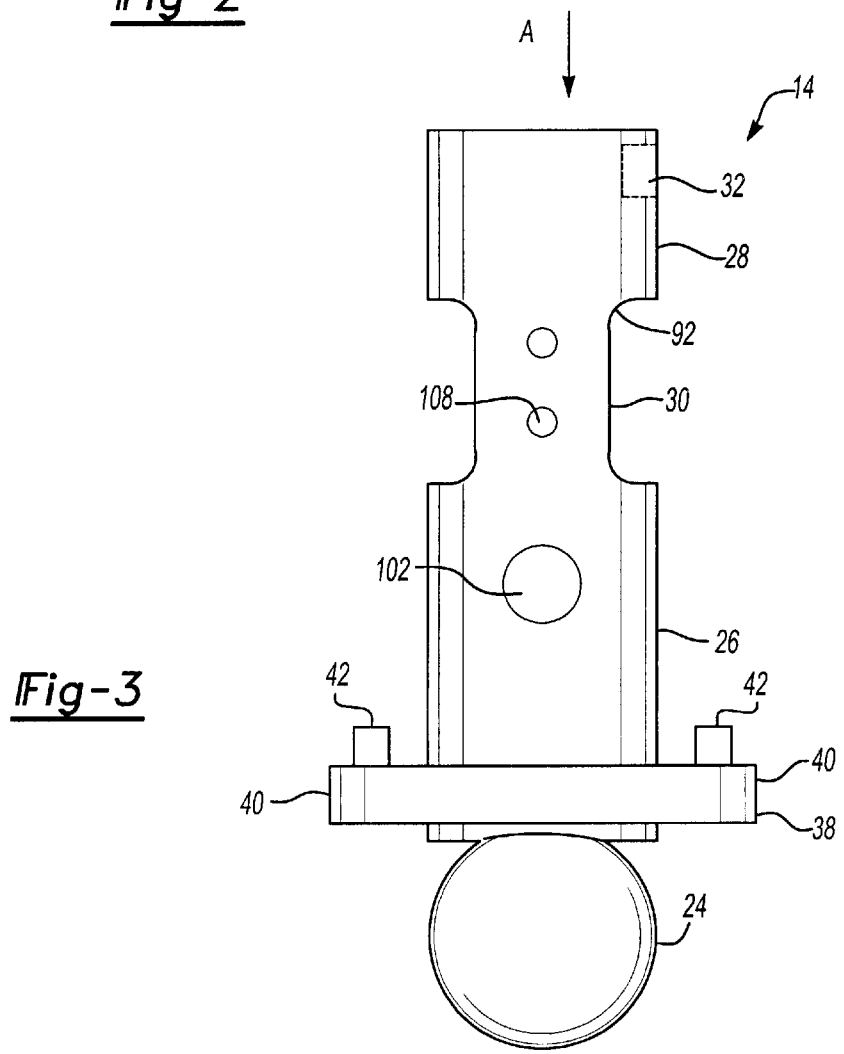
FIG. 3 illustrates a top view of the arm of the rail receiver assembly.
Figure 9:
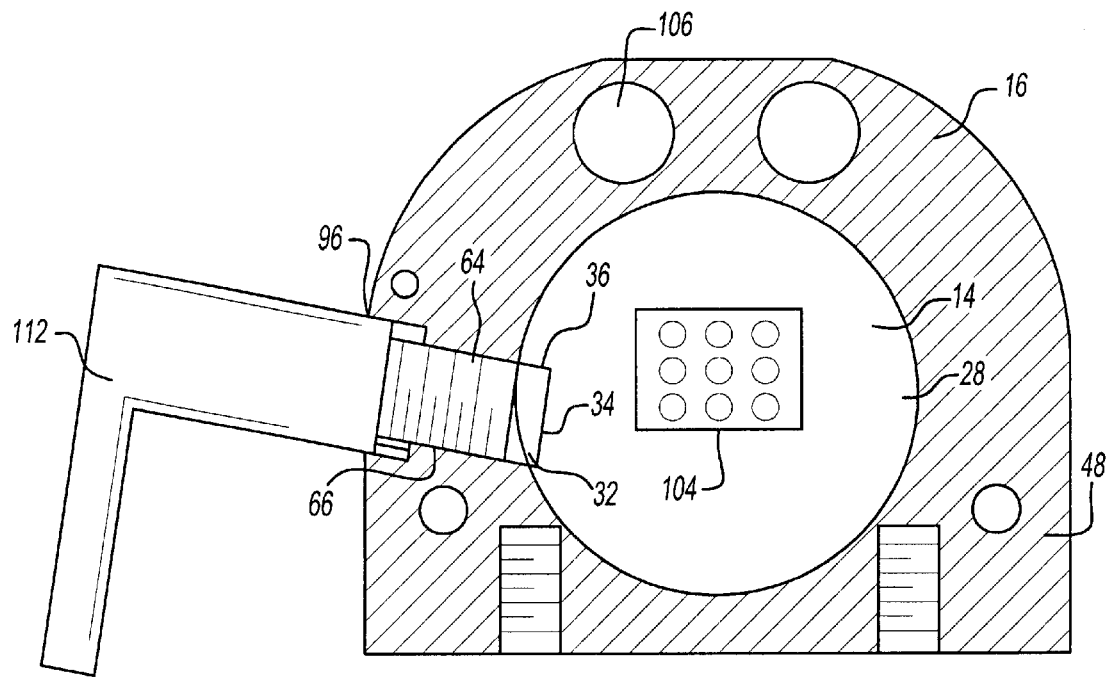
FIG. 9 illustrates a cross sectional view taken along line 9—9 of FIG. 4 of the handle prior to securing the arm to the mounting receiver.
Figure 10:
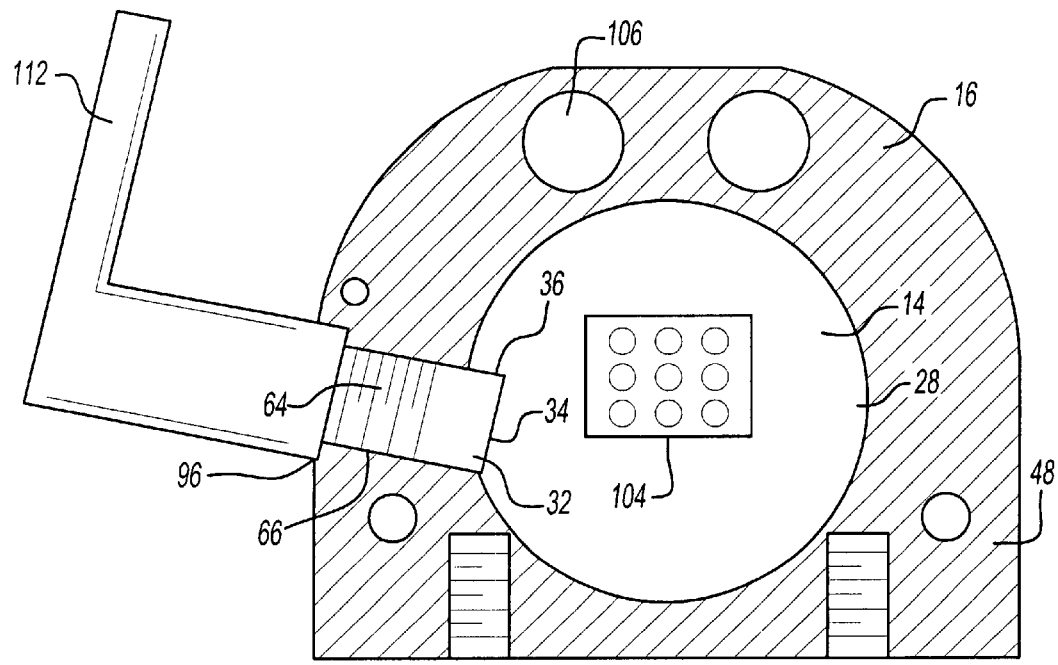
FIG. 10 illustrates a cross sectional view taken along line 9—9 of FIG. 4 of the handle securing the arm to the mounting receiver.

A notch 32 located in the rearward enlarged section 28 includes a first face 34 and a substantially perpendicular second face 36 (illustrated in FIGS. 9 and 10). A collar 38 between the ball joint 24 and the forward enlarged portion 26 includes a pair of opposing flanges 40 and a curved lower surface 44. The arm 14 further includes an electrical port 102 which carries an electrical connection to a plurality of sensors. As shown in FIG. 3, each flange 40 includes a pin 42 substantially parallel to the axis A of the arm 14.

Figure 4:
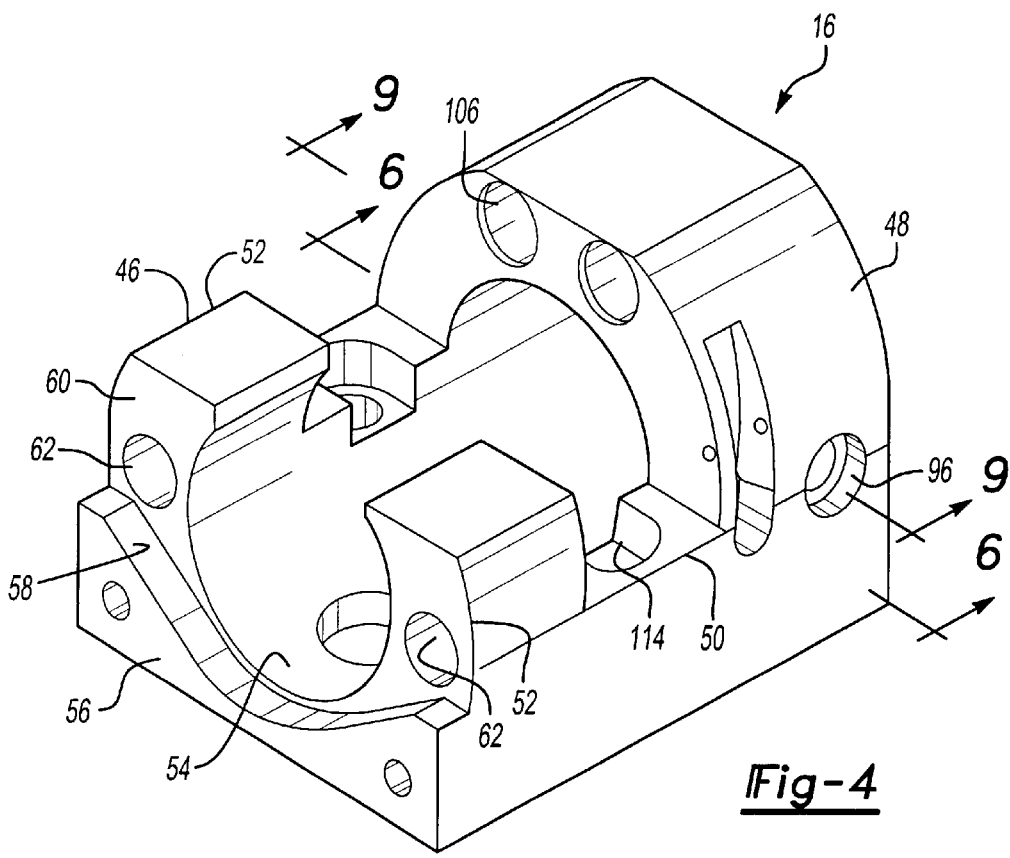
FIG. 4 illustrates a perspective view of the mounting receiver of the rail receiver assembly.

The mounting receiver 16, illustrated in FIG. 4, includes a forward mounting portion 46 having a forward inner peripheral surface, a rearward mounting portion 48 having a rearward inner peripheral surface, and an intermediate open portion 50. The forward mounting portion 46 includes a pair of opposed spaced apart flanges 52 which define a top opening 54. The opening 54 has a dimension greater than the recessed dimension of the intermediate recessed section 30 of the arm 14 such that the intermediate recessed section 30 can pass between the flanges 52. The forward and rearward mounting portions 46, 48 have inner dimensions approximately equal to the outer dimensions of the forward and rearward enlarged sections 26, 28, respectively. An aperture 114 in the mounting receiver 16 receives a fastener which secures the mounting receiver 16 to the rail 18.

A guide portion 56 secured to the front surface 60 of the forward mounting portion 46 includes a curved upper surface 58 substantially shaped to correspond to the curved lower surface 44 of the collar 38. In the preferred embodiment, the guide portion 56 and the collar 38 are an integral part of the mounting receiver 16 and t he arm 14, respectively. However, the guide portion 56 and the collar 38 could also be attached as separate components. The upper surface 58 of the guide portion 56 is positioned slightly under the opening 54 formed by the pair of flanges 52. When the arm 14 is positioned in the mounting receiver 16, the lower surface 44 of the collar 38 is received on the upper surface 58 of the guide portion 56. A pair of apertures 62 on the front surface 60 of the forward mounting portion 46 substantially receive the pair of pins 42, the engagement preventing rotation of the arm 14 in the mounting receiver 16 and minimizes looseness.

Figure 5:
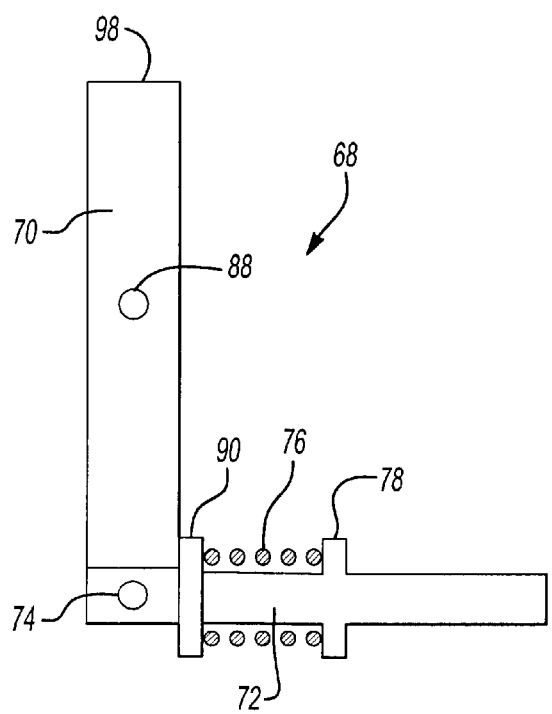
FIG. 5 illustrates the latch member of the rail receiver assembly.

A latch member 68 illustrated in FIG. 5 is located in the rearward mounting portion 48 of the mounting receiver 16 and secures the arm 14 in the mounting receiver 16. The latch member 68 includes a first latch member 70 pivotally attached to a second latch member 72 at a first pivot point 74. A spring member 76 positioned around the second latch member 72 is located between an annular shoulder 78 and a retainer ring 90 positioned proximate to the first pivot point 74.

The latch member 68 is positioned in a latch receiving portion 80 in the mounting receiver 16, illustrated in FIG. 6. The latch receiving portion 80 includes a second passage 82, a first portion 84, and an angled portion 86. As illustrated in FIG. 7, the second latch member 72 is received in the second passage 82 and is substantially perpendicular to the axis A of the arm 14 once mounted in the mounting receiver 16. The first latch member 70 is pivotally attached to the latch receiving portion 80 at a second pivot point 88 substantially between the first portion 84 and the angled portion 86.

FIG. 7 illustrates the latch member 68 in an engaged position. When the arm 14 is received in the mounting portion 16 and slid rearwardly, the rearward enlarged section 28 of the arm 14 engages and presses outwardly the second latch member 72. The spring member 76 is compressed between the annual shoulder 78 and a retainer ring 90 in the second passage 82. The second latch member 72 runs along the outer dimension of the rearward enlarged section 28, allowing the arm 14 to travel. When the intermediate recessed portion 30 aligns with the second passage 82, the spring member 76 presses on the annular shoulder 78, moving the second latch member 72 inwardly to engage a surface 92 (illustrated in FIG. 2 and 3) in the intermediate recessed portion 30. This engagement prevents removal of the arm 14 from the mounting receiver 16. In this position, the first latch member 70 is substantially perpendicular to the second latch member 72 and again in the engaged position, providing a visual indication that the arm 14 is locked in the mounting portion 16. In one embodiment, color can be added to the second latch member 72 to provide this indication. The color would only be visible when the latch mechanism 68 is in the disengaged position.

When the arm 14 is to be removed from the mounting receiver 16, an upper end 98 of the first latch member 70 is pivoted inwardly at the second pivot point 88 by an operator to contact the angled portion 86. The first pivot point 74 moves outwardly, pulling the second latch member 72 outwardly and compressing the spring member 76 between the annular shoulder 78 and a retainer ring 90, removing the second latch member 72 from the surface 92, as illustrated in FIG. 8. In this position, the arm 14 can be removed from the mounting receiver 16.

A rotatable handle 112 can also be employed to further reduce looseness of the arm 14 in the mounting receiver 16. As illustrated in FIG. 9, an aperture 96 in the rearward mounting portion 48 receives a threaded portion 64 of the handle 112 to manually secure the arm 14 to the mounting receiver 16. In the open position, it is preferred that the handle 112 be directed downwardly. An operator rotates the handle 112, the threaded portion 64 of the handle 112 substantially engages the threaded portion 64 of the aperture 96. Eventually, the threaded portion 66 contact the first face 34 and the second face 36 of the notch 32, as illustrated in FIG. 10, locking the arm 14 in the mounting receiver 16. When locked, it is preferred that the handle 112 be directed upwardly, further providing an indication that the arm 14 is mounted in the mounting receiver 16. It is preferred that the handle 112 be rotatable between 0 and 180°.

Figure 11:
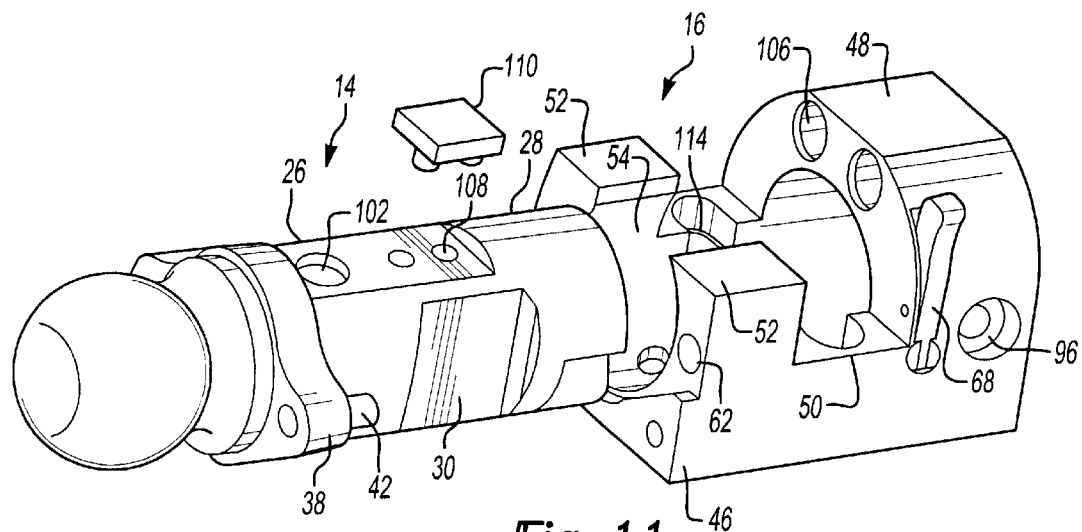
FIG. 11 illustrates the arm and the mounting receiver prior to assembly.

FIGS. 9 and 10 further illustrate an electrical connector 104 in the rearward enlarged section 28 of the arm 14. When the arm 14 is mounted in the mounting receiver 16, the electrical connector 104 of the arm 14 engages an electric source to provide electricity. Electricity travels from the electrical connector 104 and through wires located in the hollow portion of the arm 14, leading through the electrical port 102 (as shown in FIGS. 2 and 3) and to the gripper 20. Additionally, the mounting receiver 16 further includes a pair of air ports 106, as illustrated in FIG. 11. The air ports 106 each receive an air supply tube from an air supply source. The air supply tubes extend through the air ports 106 and into a modular block 110 positioned to engage a pair of apertures 108 on the arm 14. From the modular block 110, air is supplied through tubes to the gripper 20.

Figure 12:
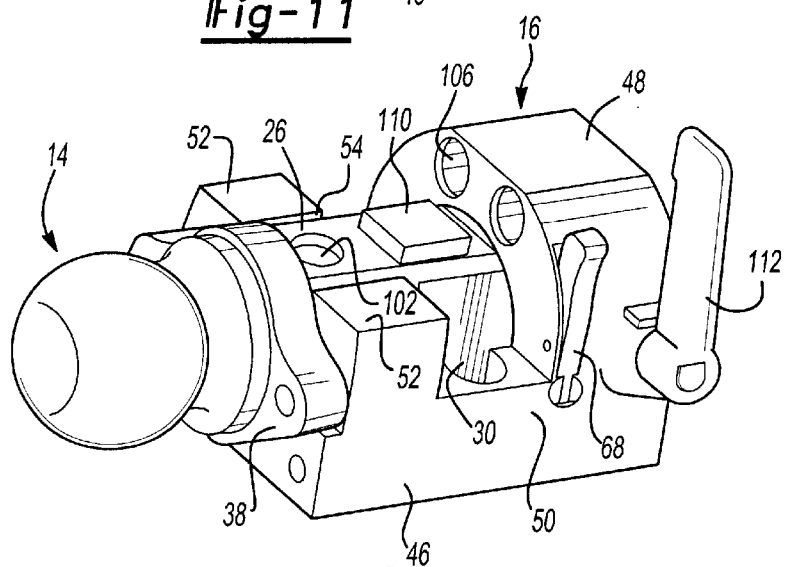
FIG. 12 illustrates the arm and the mounting receiver after assembly.

When arm 14 is to be mounted in the mounting receiver 16, illustrated in FIG. 11, the intermediate recessed section of the arm 14 is positioned over the opening 54 and moved downwardly. The arm 14 is then moved rearwardly, and the rearward enlarged portion 28 substantially contacts the second latch member 72 of the latch mechanism 68, pushing the second latch member 72 outwardly and against the spring bias created by the spring member 76. As the arm 14 continues to be inserted, the second latch member 72 eventually engages the surface 92 in the intermediate recessed section 30, and the spring member 76 biases the second latch member 72 inwardly, returning the latch member 68 to the engaged position. The pins 42 engage the apertures 62, minimizing looseness in the arm 14 and providing for proper orientation. A handle 112 is rotated and engages a notch 32 in the rearward enlarged section 28, further minimizing looseness. Once the arm 14 is positioned in the mounting receiver 16, the rearward enlarged portion 28 is positioned in the rearward enlarged section 48, the intermediate recessed portion 30 is positioned in the intermediate open portion 50, and the forward enlarged portion 26 is positioned in the forward enlarged section 46, as illustrated in FIG. 12.

When the arm 14 is to be removed from the mounting portion 16, the handle 112 is rotated to remove the threaded portion 66 from the notch 32. The first latch member 70 is pushed inwardly to disengage the latch mechanism 68 from the arm 14. The arm 14 can then be moved forwardly until the intermediate recessed portion 30 aligns with the intermediate recessed portion 50. The arm 14 is moved upwardly and removed from the mounting receiver 16 through the opening 54.

Figure 13:
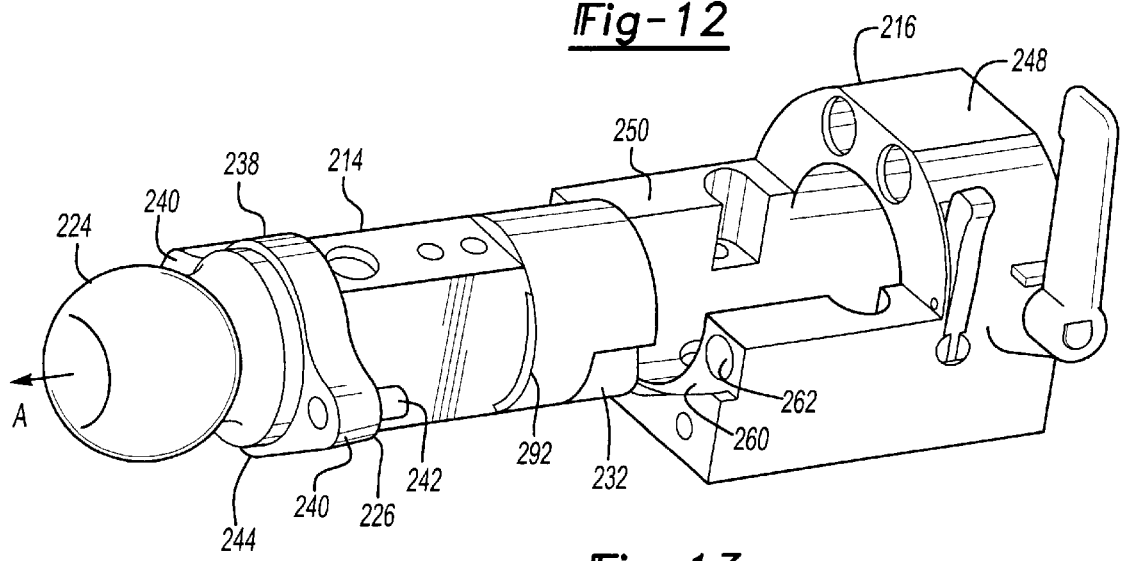
FIG. 13 illustrates a perspective view of a second embodiment of the arm and mounting receiver prior to assembly.

FIG. 13 illustrates an alternative embodiment of an arm 214 and a mounting receiver 216. The arm 214 is of a substantially uniform diameter, and a collar 238 between the ball joint 224 and the front end 226 of the arm 214 includes a pair of flanges 240 and a curved lower surface 244. Each flange 240 includes a pin 242 substantially parallel to the axis A of the arm 214. A slot 292 is located proximate to the notch 232 to receive the latch member 68.

The mounting receiver 216 includes an open forward portion 250 and a closed rearward portion 248 having a rearward inner peripheral surface extending 360°. A pair of apertures 262 are positioned on the front surface 260 of the forward portion 250. In this embodiment, the mounting receiver 216 receives an arm 214 of uniform diameter. The arm is dropped into the open forward portion 250 and slid rearwardly to position within the rearward portion 248. The arm 214 is only rearwardly slid the length of the rearward portion 248, but is secured along the entire length of the mounting receiver 216.

Figure 14:
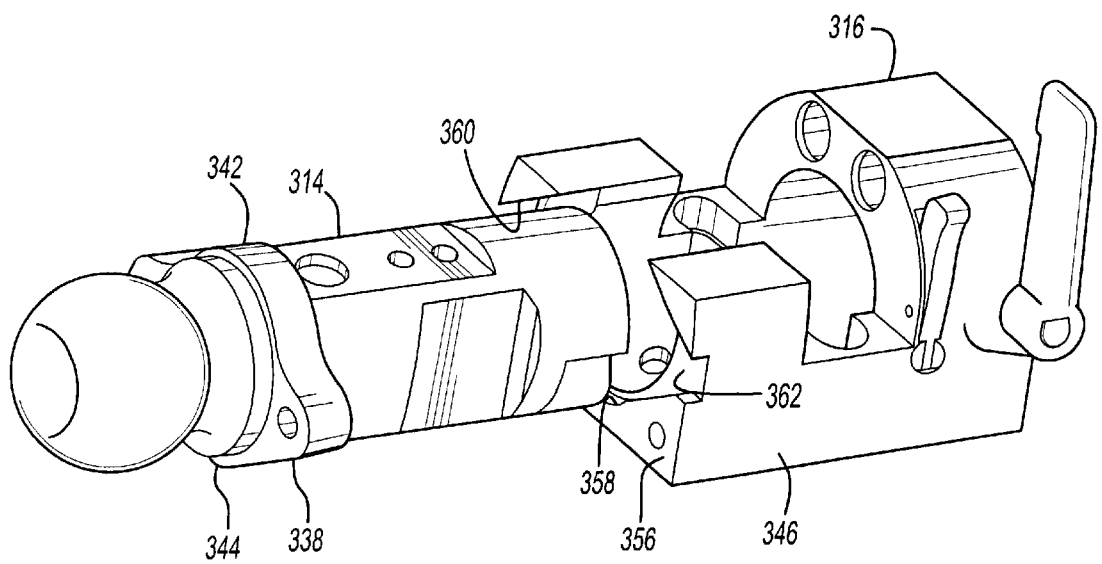
FIG. 14 illustrates a perspective view of a third embodiment of the arm and mounting receiver prior to assembly.

FIG. 14 illustrates a third embodiment of the present invention. The arm 314 includes a collar 338 including a curved arm lower surface 344 and a curved arm upper surface 342. The forward mounting portion 346 of the mounting receiver 316 includes guide portion 356 including a curved upper surface 360 which is substantially shaped to correspond to the curved arm upper surface 342 of the arm 314 and a curved lower surface 358 substantially shaped to correspond to the curved arm lower surface 344 of the arm 314. The curved upper surface 360 and the curved lower surface 358 create an opening 362 substantially sized and shaped to receive the collar 338. When the arm 314 is received in the mounting receiver 316, the arm curved surfaces 342, 344 of the collar 338 of the arm 314 engage in the curved surfaces 358, 360 of the opening 362 of the mounting receiver 316. This contact secures the arm 314 into the mounting receiver 316, minimizing looseness.

There are several advantages to utilizing a mounting support structure for a multi-functional arm of the present invention. For one, the latch member 68 provides a visual indication when the latch mechanism 68 is in the engaged position. The pins 42 secure the arm 14 to the mounting portion 16 to reduce looseness, allowing for handleless mounting is desired. If a handle 112 is utilized, the handle 112 forces and locks the pins 42 into position, offset forces directed to the arm 14 and pushes the rearward mounting portion 48 of the mounting receiver 16 down, creating a three point plane for stability.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A mounting assembly comprising:

an arm including a forward enlarged section having a forward outer dimension, a recessed section having a recessed outer dimension substantially smaller than said forward outer dimension, and said arm further includes one of at least a pin and an aperture that extends parallel to an axis of said arm; and a mounting receiver including a forward mounting portion with a forward inner peripheral surface having a forward inner dimension substantially approximately equal to said forward outer dimension of said arm, an access slot providing access to said forward inner peripheral surface extending for a slot dimension which is greater than said recessed outer dimension of said arm such that said recessed section can pass through said access slot, and at least one of the other of said pin and said aperture in a front surface of said forward mounting portion positioned with said aperture for aligning and receiving said pin when said forward enlarged section of said arm is received in said forward mounting portion of said mounting receiver.

2. The mounting assembly as recited in claim 1 wherein said pin extends substantially parallel to said axis.

3. The mounting assembly as recited in claim 1 wherein said arm further includes a collar, and said at least one pin is positioned on said collar located proximate to said forward enlarged section of said arm.

4. The mounting assembly as recited in claim 3 wherein said collar includes a pair of flanges, and each of said flanges includes one of said at least one pins.

5. The mounting assembly as recited in claim 1 wherein a pair of pins align with and are received by a pair of apertures when said arm is received in said mounting receiver.

6. The mounting assembly as recited in claim 1 wherein said at least one pin is located on said arm and said at least one aperture is located on said mounting receiver.

7. The mounting assembly as,recited in claim 1 wherein said arm further includes a curved surface which is received in a curved support in said mounting receiver when said arm is received in said mounting receiver.

8. A mounting assembly comprising:

an arm including a forward enlarged section having a forward outer dimension, a recessed section having a recessed outer dimension substantially smaller than said forward outer dimension, and one of at least a pin and an aperture proximate to said forward enlarged section and extending parallel to an axis of said arm;

a mounting receiver including a forward mounting portion with a forward inner peripheral surface having a forward inner dimension substantially approximately equal to said forward outer dimension of said arm, an access slot providing access to said forward inner peripheral surface extending for a slot dimension which is greater than said recessed outer dimension of said arm such that said recessed section can pass through said access slot, and at least one of the other of said pin and said aperture in a front surface of said forward mounting portion positioned with said aperture for aligning and receiving said pin when said forward enlarged section of said arm is received in said forward mounting portion of said mounting receiver; and a latch mechanism in a rearward mounting section of said mounting receiver spring biased to engage said recessed section of said arm when said arm is positioned in said mounting receiver.

9. The mounting assembly as recited in claim 8 wherein said latch mechanism includes a first latch member pivotally attached to an inwardly spring biased second latch member, a rearward enlarged section of said arm pressing said second latch member outwardly against a spring bias during insertion of said arm in said mounting receiver.

10. The mounting assembly as recited in claim 9 wherein said second latch member substantially engages said recessed section of said arm when said arm is positioned in said mounting receiver, said first latch member being substantially perpendicular to said second latch member.

11. The mounting assembly as recited in claim 9 wherein said first latch member is manually pivoted inwardly, pulling said pivotally attached second latch member outwardly and disengaging said second latch member from said recessed section of said arm, allowing removal of said arm from said mounting receiver.

12. A mounting assembly comprising:

an arm including a forward enlarged section having a forward outer dimension, a recessed section having a recessed outer dimension substantially smaller than said forward outer dimension, and one of at least a pin and an aperture proximate to said forward enlarged section and extending parallel to an axis of said arm, and said pin extends substantially parallel to said axis;

a mounting receiver including a forward mounting portion with a forward inner peripheral surface having a forward inner dimension substantially approximately equal to said forward outer dimension of said arm, an access slot providing access to said forward inner peripheral surface extending for a slot dimension which is greater than said recessed outer dimension of said arm such that said recessed section can pass through said access slot, and at least one of the other of said pin and said aperture in a front surface of said forward mounting portion positioned with said aperture for aligning and receiving said pin when said forward enlarged section of said arm is received in said forward mounting portion of said mounting receiver; and a manually rotatable threaded portion substantially engages a notch in a rearward enlarged section of said arm to prevent looseness of said arm in said mounting receiver, said threaded portion being manually rotatable in an opposite direction to substantially disengage said threaded portion from said notch to allow for removal of said arm.

13. A mounting assembly comprising:

an arm including one of at least a pin and an aperture extending parallel to an axis of said arm; and a mounting receiver including at least one of the other of said pin and said aperture in a front surface of said mounting receiver positioned with said aperture for aligning and receiving said pin when said arm is received in said mounting receiver and a latch mechanism spring biased to engage said arm when said arm is positioned in said mounting receiver.

14. The mounting assembly as recited in claim 13 wherein said arm is substantially of a uniform diameter and one of at least said pin and said aperture is proximate to a first end of said arm and said mounting receiver further includes an open forward mounting portion and a rearward mounting portion with a rearward inner peripheral surface having a rearward inner diameter substantially approximately equal to said uniform diameter of said arm and at least one of the other of said pin and said aperture in a front surface of said forward mounting portion positioned with said aperture for aligning and receiving said pin when said arm is received in said forward mounting portion of said mounting receiver.

15. The mounting assembly as recited in claim 13 wherein said latch mechanism includes a first latch member pivotally attached to an inwardly spring biased second latch member, a rearward enlarged section of said arm pressing said second latch member outwardly against a spring bias during insertion of said arm in said mounting receiver.

16. The mounting assembly as recited in claim 13 wherein said at least one pin is located on said arm and said at least one aperture is located on said mounting receiver.

17. The mounting receiver as recited in claim 13 wherein said arm further includes a forward enlarged section having a forward outer dimension, a recessed section having a recessed outer dimension substantially smaller than said forward outer dimension, and one of at least said pin and said aperture proximate to said forward enlarged section and said mounting receiver further includes a forward mounting portion with a forward inner peripheral surface having a forward inner dimension substantially approximately equal to said forward outer dimension of said arm, an access slot providing access to said forward inner peripheral surface extending for a slot dimension which is greater than said recessed outer dimension of said arm such that said recessed section can pass through said access slot, and at least one of the other of said pin and said aperture in said front surface of said forward mounting portion positioned with said aperture for aligning and receiving said pin when said forward enlarged section of said arm is received in said forward mounting portion of said mounting receiver.

18. A mounting assembly comprising:

an arm including one of at least a pin and an aperture extending parallel to an axis of said arm; and a mounting receiver including at least one of the other of said pin and said aperture in a front surface of said mounting receiver positioned with said aperture for aligning and receiving said pin when said arm is received in said mounting receiver and a latch mechanism spring biased engage said arm when said arm is positioned in said mounting receiver, wherein said latch mechanism includes a first latch member pivotally attached to an inwardly spring biased second latch member, a rearward enlarged section of said arm pressing said second latch member outwardly against a spring bias during insertion of said arm in said mounting receiver and wherein said second latch member substantially engages a recessed section of said arm when said arm is positioned in said mounting receiver, said first latch member being substantially perpendicular to said second latch member.

19. A mounting assembly comprising:

an arm including one of at least a pin and an aperture extending parallel to an axis of said arm; and a mounting receiver including at least one of the other of said pin and said aperture in a front surface of said mounting receiver positioned with said aperture for aligning and receiving said pin when said arm is received in said mounting receiver and a latch mechanism spring biased to engage said arm when said arm is positioned in said mounting receiver, wherein said latch mechanism includes a first latch member pivotally attached to an inwardly spring biased second latch member, a rearward enlarged section or said arm pressing said second latch member outwardly against a spring bias during insertion of said arm in said mounting receiver and wherein said first latch member is manually pivoted inwardly, pulling said pivotally attached second latch member outwardly and disengaging said second latch member from a recessed section of said arm, allowing removal of said arm from said mounting receiver.

20. A mounting assembly comprising:

an arm including a forward enlarged section having a forward outer dimension, a recessed section having a recessed outer dimension substantially smaller than said forward outer dimension, and a first stop surface proximate to said forward enlarged section of said arm; and a mounting receiver including a forward mounting portion with a forward inner peripheral surface having a forward inner dimension substantially approximately equal to said forward outer dimension of said arm, an access slot providing access to said forward inner peripheral surface extending for a slot dimension which is greater than said recessed outer dimension of said arm such that said recessed section can pass through said access slot, said forward mounting portion including a second stop surface which cooperates with said first stop surface of said arm to prevent relative rotation between said arm and said mounting receiver when said forward enlarged section of said arm is received in said forward mounting portion of said mounting receiver.

21. The mounting assembly as recited in claim 20 wherein said arm includes a collar and said first stop surface includes an upper collar surface and a lower collar surface and said mounting receiver includes an opening and said second stop surface includes an upper opening surface which substantially corresponds to said upper collar surface and a lower opening surface which substantially corresponds to said lower collar surface, said collar being substantially received in said opening when said arm is received said mounting receiver.

\* \* \* \* \*

UNITED STATES PATENT AND TRADEMARK OFFICE
CERTIFICATE OF CORRECTION

PATENT NO. : 6,540,188 B2 Page 1 of 1
DATED : April 1, 2003
INVENTOR(S) : Jenkins et al.

It is certified that error appears in the above-identified patent and that said Letters Patent is hereby corrected as shown below:

Column 9,
Line 1, "biased engage" should be -- biased to engage --.

Signed and Sealed this

Twelfth Day of August, 2003

JAMES E. ROGAN
*Director of the United States Patent and Trademark Office*